United States Patent [19]

Hureau et al.

[11] Patent Number: 4,911,872
[45] Date of Patent: Mar. 27, 1990

[54] PROCESS OF MAKING A PERFORATED FILM

[76] Inventors: Jean C. M. Hureau, 56 rue Léon, 78310 Maurepas; Jacques Hureau, 72600 Saint-Remy-des-Monts, both of France

[21] Appl. No.: 287,557

[22] Filed: Dec. 20, 1988

Related U.S. Application Data

[63] Continuation of Ser. No. 883,309, Jul. 8, 1986, abandoned.

[30] Foreign Application Priority Data

Jul. 11, 1985 [FR] France ................................ 85 10669

[51] Int. Cl.$^4$ ...................... B29C 47/00; B65D 33/01; B65D 33/02; B65D 33/10
[52] U.S. Cl. .................................... 264/146; 264/156; 264/167; 264/209.5; 264/288.8; 264/DIG. 70; 264/DIG. 81; 383/8; 383/12; 383/17; 383/24; 383/103; 383/117; 428/35.5; 428/36.9
[58] Field of Search ............... 264/146, 147, 154, 155, 264/156, 167, 209.5, 210.1, 288.8, DIG. 70, DIG. 81; 425/290, 311, 325, 380, 465; 53/409, 410, 413; 220/94 R, 94 A, DIG. 14; 383/6, 7, 8, 12, 17, 22, 24, 103, 117, 119; 428/35.5, 36.9, 36.92, 398

[56] References Cited

U.S. PATENT DOCUMENTS

| | | | |
|---|---|---|---|
| 3,225,386 | 12/1965 | Newman | 425/447 |
| 3,252,181 | 5/1966 | Hureau | 425/465 X |
| 3,756,300 | 9/1973 | Nalle, Jr. | 383/7 |
| 3,917,889 | 11/1975 | Gaffney et al. | 428/36 |
| 4,038,008 | 7/1977 | Larsen | 264/154 X |
| 4,165,832 | 8/1979 | Kuklies et al. | 383/8 |
| 4,346,834 | 8/1982 | Mazumdar | 383/8 |
| 4,367,841 | 1/1983 | Mazumdar | 383/8 |
| 4,610,028 | 9/1986 | Nattrass | 383/7 |
| 4,636,162 | 1/1987 | Pavy et al. | 264/DIG. 81 |

FOREIGN PATENT DOCUMENTS

| | | | |
|---|---|---|---|
| 0109470 | 5/1984 | European Pat. Off. . | |
| 2802849 | 7/1978 | Fed. Rep. of Germany | 383/103 |
| 2807162 | 8/1978 | Fed. Rep. of Germany | 383/8 |
| 3300573 | 7/1983 | Fed. Rep. of Germany | 383/117 |
| 2093346 | 1/1972 | France . | |
| 2131842 | 11/1972 | France | 425/290 |
| 2138198 | 1/1973 | France | 264/DIG. 81 |
| 2144606 | 2/1973 | France | 425/290 |
| 2259765 | 8/1975 | France | 383/22 |
| 349432 | 11/1977 | France . | |
| 2529529 | 1/1984 | France . | |
| 2572991 | 5/1986 | France | 264/156 |
| 7801075 | 9/1978 | Netherlands | 383/103 |
| 465156 | 12/1968 | Switzerland . | |
| 2095609 | 10/1982 | United Kingdom | 425/325 |

Primary Examiner—Jeffery Thurlow
Assistant Examiner—Leo B. Tentoni
Attorney, Agent, or Firm—Fisher, Christen & Sabol

[57] ABSTRACT

This invention relates to a process for making a tubular structure formed by a film of extruded synthetic matter whose walls are at least partially perforated, including the steps of extruding from an annular die a tubular film having gaps or voids obtained in manner known per se by teeth which temporarily obturate the outlet of said die, and extruding and forming the film on leaving the die after flow of matter in the plastic state, upstream of the die, in a ring-shaped passage of which the outlet constitutes the die, this passage being of constant thickness equal to the width of the extrusion slot and consequently to the final thickness of the film, the flow of plastic material in this ring-shaped passage causing an effect of lamination of the matter ensuring dimensional stability, particularly the thickness of the film obtained at the outlet of the die, and in particular avoiding the formation of excess thickness or surface roughness on the film thus extruded. The invention also relates to a device for carrying out this process.

5 Claims, 5 Drawing Sheets

Fig. 6
Fig. 7
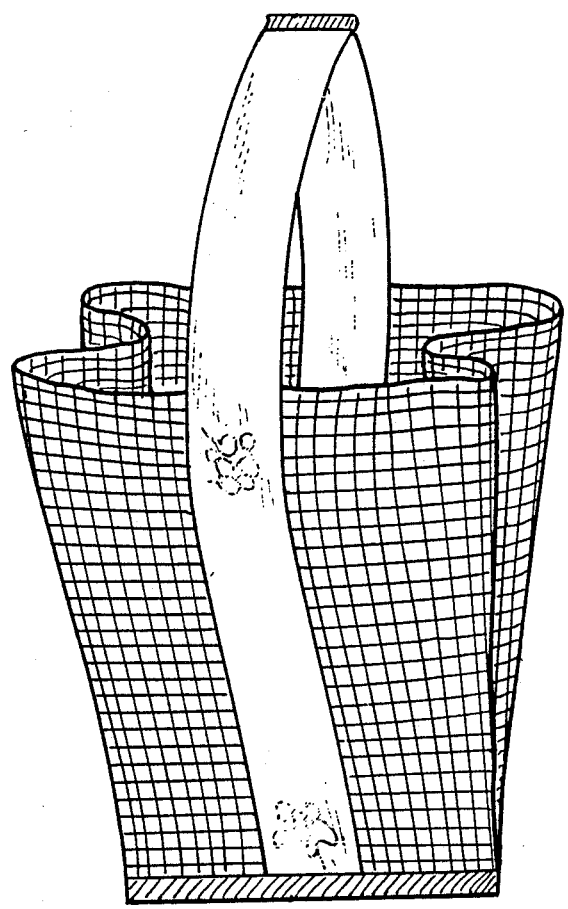
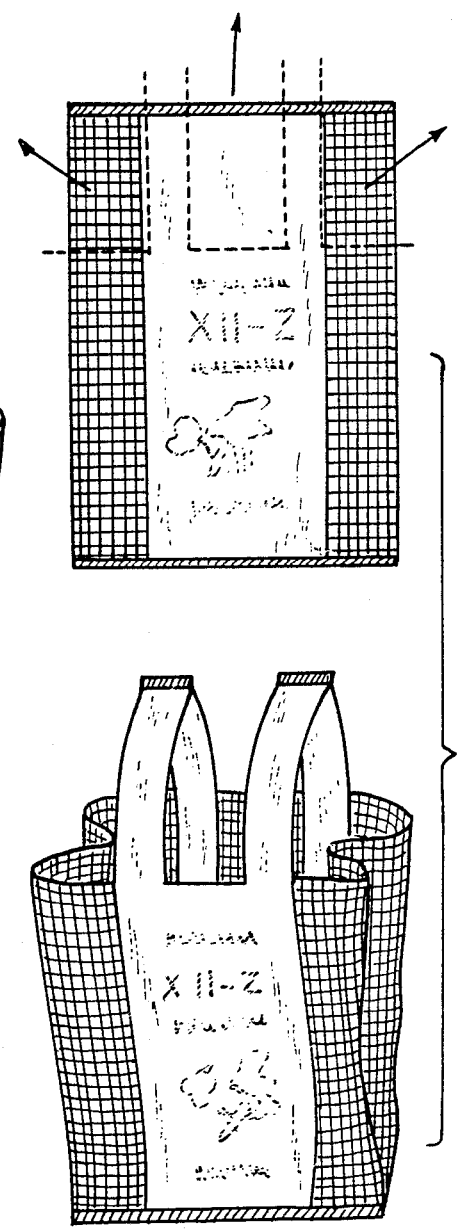

PROCESS OF MAKING A PERFORATED FILM

This is a continuation of prior U.S. application Ser. No. 883,309, filing date, July 8, 1986, now abandoned.

BACKGROUND OF THE INVENTION

The present invention relates to a process, and to a device for carrying out said process, for making perforated films of regular and constant thickness at all points of the film. The invention also relates to the film thus obtained and to the finished products fashioned from this film.

Various processes starting from the extrusion of a film of synthetic material are known, in which perforations are made intermittently by the positioning of teeth which momentarily obturate the extrusion die.

In this way, films are obtained whose surfaces present appropriately distributed gaps or voids and in particular films comprising solid zones disposed longitudinally or transversely, alternating with these perforated zones formed by strands of matter separated by said gaps or voids.

The major drawback observed in the production of such films is the irregular thickness of the film thus produced, particularly at the level of the gaps or voids in the surface.

In fact, it is observed that, in the known devices, at the instant when the flow of matter is interrupted, then re-established, in order to constitute the apertures and gaps in the wall of the film, irregularities in thickness occur, the matter tending to form an excess thickness at the level of the edges defining the gaps and in particular at the intersection of the strands.

This particular feature presents various drawbacks:

Firstly, when the films thus formed are packed, for example wound on a reel, the excess thicknesses which come into register with one another provoke irregularities in the arrangement of the winding and it is difficult to obtain a regular winding over a great length.

In addition, when the film supplies a machine, either for continuous printing (on the solid zones) or to shape the film to produce finished products, for example bags for packaging, the surface irregularities lead to an irregular and sometimes unforeseeable path of the film in the machine, consequently causing defective shaping.

In particular, when the film, on leaving the die, is subjected to drawing in order to increase its dimensions and to cause molecular orientation at the level of the strands, intended to reinforce the mechanical strength thereof, the efforts of traction being transmitted irregularly due to the unequal thicknesses cause an irregular distribution of the matter; it is observed that the interlaced strands considerably resist drawing at the level of the nodes formed by the intersection of two strands (generally in excess thickness), whilst drawing principally affects the median zones of the strands located between two node; this results in an irregular drawing which is unaesthetic, and especially an unequal distribution of the efforts with the constitution of zones of weakness.

Finally, when the film is shaped to constitute a finished product such as a bag for packaging, the unequal thickness distributed in particular in the perforated zones produce a rough surface which is aggressive for the packaged products.

For all these reasons, it is desirable to obtain a continuously produced film presenting a partially perforated surface, without excess thickness especially at the level of the points of intersection of the strands defining the perforated zones.

It is an object of the invention to solve this problem and to produce a film which presents solid zones and perforated zones, the thickness of the solid zones and the perforated zones (constituted by the intersecting strands) being regular and constant.

Under these conditions, the film thus produced, without excess thickness, may be immediately subjected to a drawing operation causing the tubular film to be extended, with regular elongation of the strands composing the perforated zones.

A film is thus obtained which, after drawing, presents remarkable, considerably improved properties of mechanical strength whilst conserving the advantageous regular appearance of the film both in its perforated zones and in the solid zones.

Under these conditions, the film, after drawing, which presents the desired improved mechanical properties, may be subjected to the usual operations of winding on a reel, the absence of excess thickness allowing a compact, regular winding.

Subsequent unwinding of the film in treatment machines, for example for printing thereon, particularly in the solid zones, or for fashioning on automatic shaping machines, is facilitated, thanks to the regular unwinding of the film through the various operational phases.

The finished articles made with the film according to the invention, for example bags for packaging, etc ..., may advantageously be used for containing fragile products such as vegetables without contact with the walls of the bag causing a slow deterioration of the surface or appearance of the products contained therein.

To this end, the invention relates to a process for making a tubular structure formed by a film of extruded synthetic matter whose walls are at least partially perforated, characterized in that a tubular film is extruded from an annular die, said film comprising gaps or voids obtained in manner known per se by teeth which temporarily obturate the outlet of said die, and in that the film is extruded and formed on leaving the die after flow of matter in the plastic state upstream of the die in a ring-shaped passage of which the outlet constitutes said die, this passage being of constant thickness equal to the width of the extrusion slot and consequently to the final thickness of the film, the flow of plastic material in this ring-shaped passage causing an effect of lamination of the matter ensuring dimensional stability, particularly the thickness of the film obtained at the outlet of the die, and in particular avoiding the formation of excess thickness or surface roughness on the film thus extruded.

The invention also relates to a device for carrying out the process and comprising an extrusion device of type known per se for forming a tubular film and the device is characterized in that the extrusion slot or die associated with a comb element animated by a reciprocating movement, in manner known per se, is preceded by a ring-shaped passage of thickness identical to the height of the extrusion slot and adapted to regulate the thickness of the extruded film of which the matter is subjected, during flow in said ring-shaped passage, to an effect of lamination, the film resulting from extrusion on leaving the die presenting a regular, constant thickness allowing in particular the passage of the film in a printing machine or in a shaping machine.

SUMMARY OF THE INVENTION

The invention also relates to the film produced by carrying out the process and using the device of the invention, film characterized in that it comprises solid zones and perforated zones, all these zones being of regular and constant thickness.

The invention further relates, by way of finished product, to a bag obtained by carrying out the process described hereinabove and constituted by a bag formed by a tubular film folded flat and closed at its bottom along a transverse line of weld and two faces of said bag each comprising at least one vertical solid strip extended beyond the open transverse edge of said bag joined by a transverse line of weld, thus constituting a handle.

BRIEF DESCRIPTION OF THE DRAWINGS

The invention will be more readily understood on reading the following description with reference to the accompanying drawings, in which:

FIG. 6 and FIG. 7 show variant embodiments of a bag within the scope of the present invention.

DETAILED DESCRIPTION OF THE PREFERRED EMBODIMENTS

Figure 2:
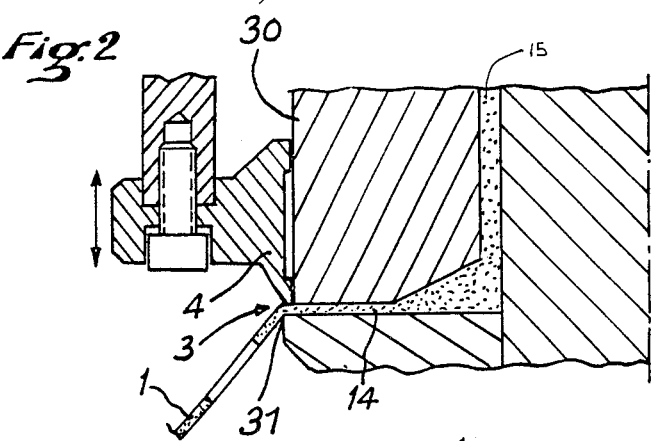
FIG. 2 shows a view in detail of the outlet device of the extrusion die of FIG. 1.

Referring now to the drawings, the Figures show that, according to the process of the invention, a tubular film 1 is extruded in manner known per se, from a die 2 provided with an extrusion slot 3 which is shown more clearly in the detailed view of FIG. 2.

A comb element 4 (FIGS. 2 and 3) provided with teeth 5, 5', 6, 6', 7, 7' moves vertically in front of the extrusion slot.

The extrusion slot 3 is defined by a circular gap between two walls, viz. a first cylindrical wall 30 against which the comb element 4 bearing teeth slides in a reciprocating movement and a second wall constituted by a circular shoulder 31 projecting outwardly with respect to the virtual extension of said first cylindrical wall, the teeth thus being adapted in their movement of extension, in position of obturation, to bear against that face of this shoulder which is perpendicular to the reciprocating movement of the teeth and parallel to the flow of the film.

Figure 3:
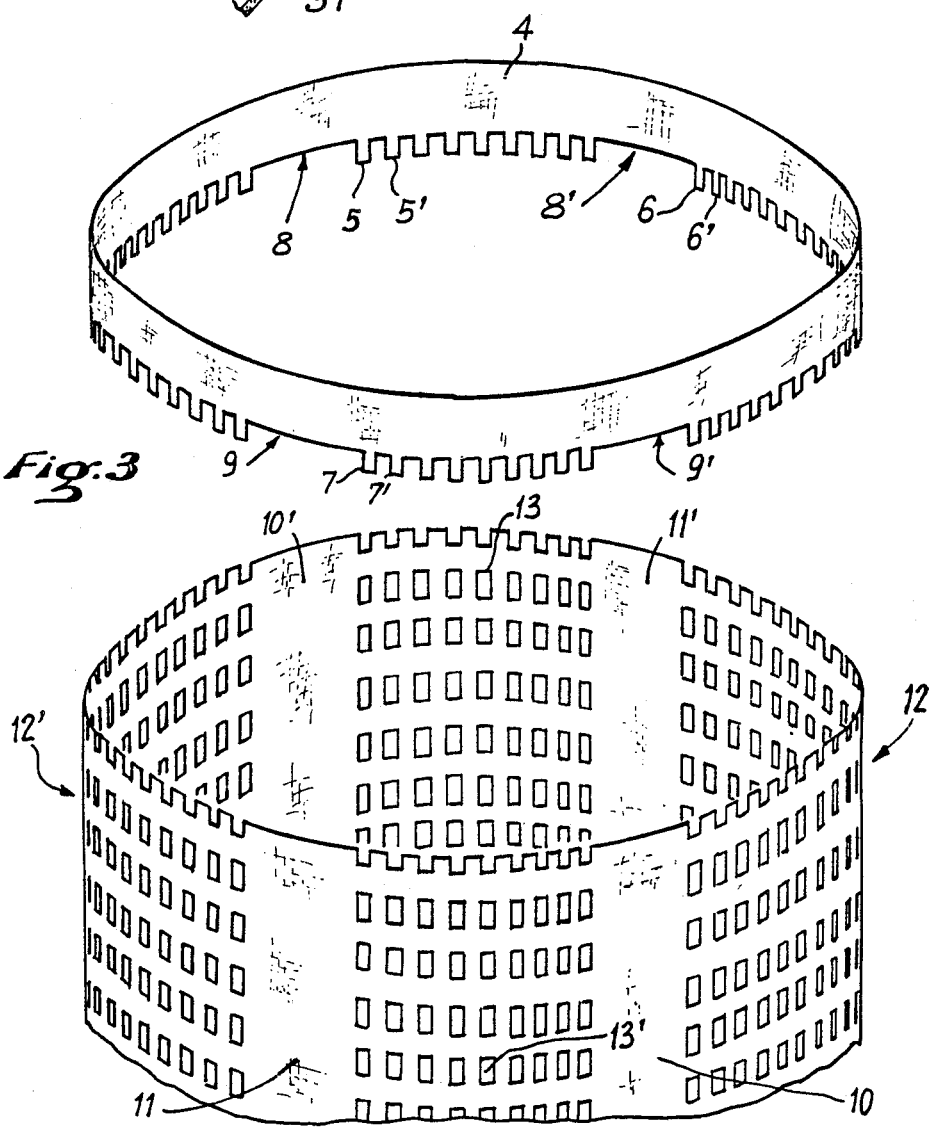
FIG. 3 is a schematic view showing the comb element bearing teeth disposed as an arc of circle opposite the extruded film coming from the die provided with the upper comb element.
Figure 4:
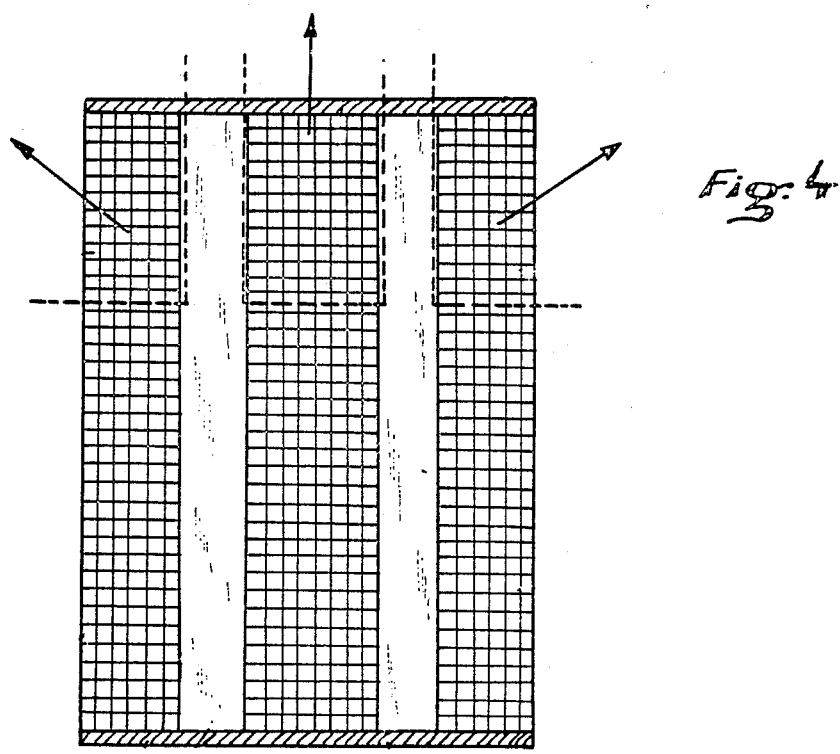
FIG. 4 shows a unitary section coming from the transverse cut-out of the film of FIG. 3 after drawing.
Figure 5:
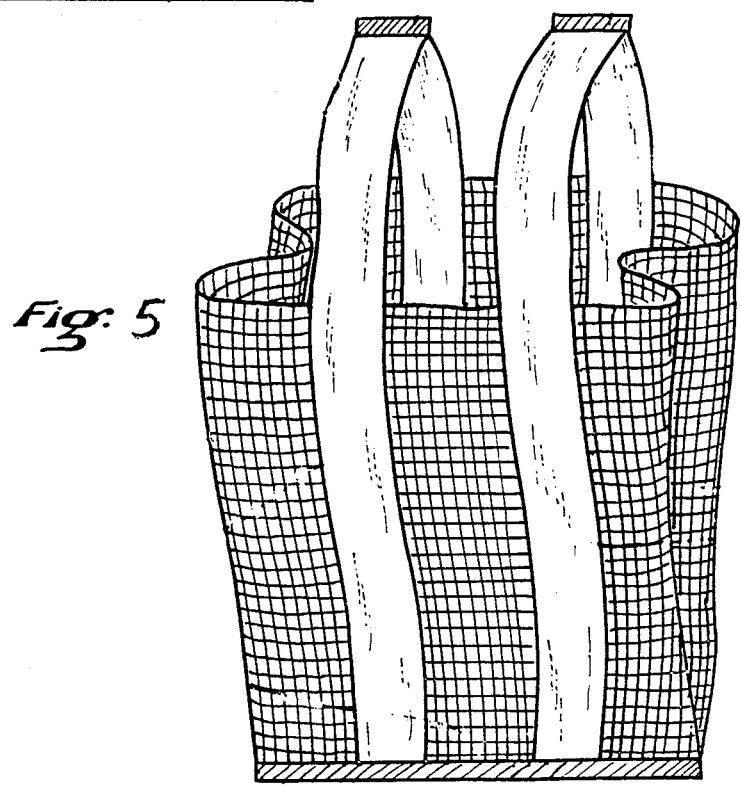
FIG. 5 shows the bag obtained by of part of the perforated zones from the cut-out of FIG. 4.

As shown in FIG. 3, the teeth are distributed in four arcs of circle spaced apart by toothless zones 8, 8', 9, 9'.

It will be understood that, in the reciprocating movement of the comb element 4, the toothless arcuate zones 8, 8', 9, 9' extrude a continuous longitudinal strip 10, 10', 11, 11' without perforations, whilst, in the toothed arcuate zones 5, 5', 6, 6', 7, 7', etc . . . , the reciprocating movement of the comb element 4 causes the formation of the perforations on the film visible in FIG. 3, which perforations define longitudinal zones 12, 12' and 13, 13' which are diametrically opposite in two's, separating the solid longitudinal strips 10, 10' and 11, 11' which are also diametrically opposite in two's.

In accordance with an essential feature of the invention, the extrusion slot 3 constituting the outlet die for the film is constituted, as shown in FIG. 2, by the annular outlet of a ring-shaped passage 14 whose thickness corresponds to the final thickness of the film 1.

The reserve of synthetic matter, maintained in known manner in a malleable state and conducted from an extruder of -known type, is introduced from the admission stack 15 towards the ring-shaped passage 14, in which passage the forced flow of the matter allows an effect of pre-calibration of the thickness of the future film and of lamination, the matter being stabilized in thickness, giving the film 1, on leaving the die 3, a uniform smooth surface, bereft of roughness or excess thickness.

This feature is important insofar as it will enable the film to be used for making bags or containers with perforated walls capable of passing in printing machines in order to receive colours, legends, advertizing or the like, and in automatic shaping machines. Furthermore, the strict flatness of the film and the absence of roughness enable the packing to be used for fragile vegetable products likely to suffer from the presence of rough or unequal surfaces, for example fruit, tubers, onions, bulbs . . .

Figure 1:
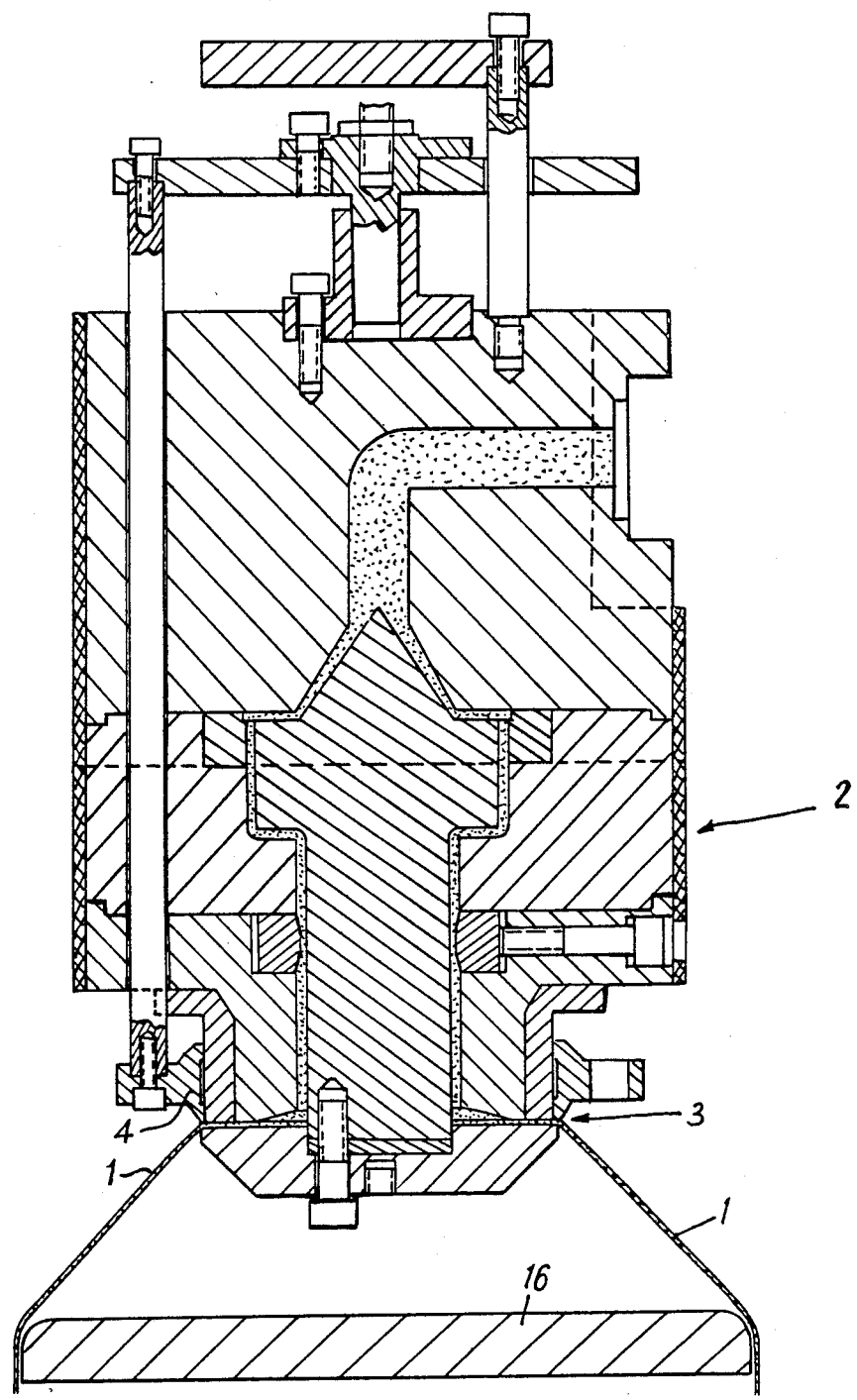
FIG. 1 shows a view of an extrusion device for carrying out the process and making the film of the invention.

On leaving the die, the film 1 passes, in manner known per se, over an expander device 16 visible in FIG. 1, which enlarges the tubular film and causes a drawing effect, increasing the diameter of the perforations, this resulting in perforated walls having a structure similar to that of a grid.

The absence of overthickness of the film thanks to the effect of pre-calibration or lamination procured by the annular passage 14 allows a regular drawing in the two directions (longitudinal and transverse) ensuring a molecular re-orientation within the strands, without creating drawn zones succeeding zones with excess thickness, source of points of rupture. On the contrary, the dimensionally regular drawing procures an improved mechanical strength in both directions.

Figure 8:
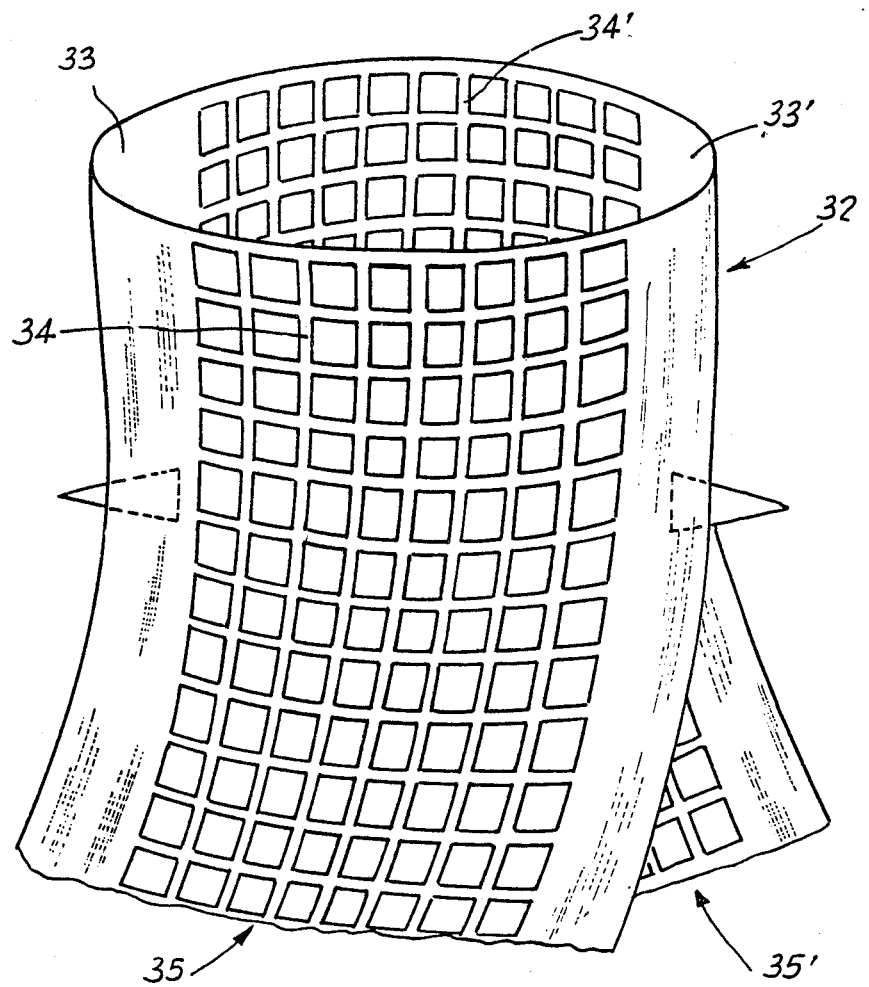
FIG. 8 shows another variant embodiment.

In the variant embodiment shown in FIG. 8, a tubular film 32 is formed, comprising two substantially opposite longitudinal solid zones 33 and 33' separated by two perforated zones 34 and 34' and the solid zones are cut longitudinally, as the film is formed, substantially at their centre in order to obtain two strips 35, 35' of flat film constituted at its centre by a perforated part provided on each side with a solid edge allowing the flat film to be used in an automatic packaging machine welding or clipping the solid edges.

FIGS. 4 to 7 show various types of bags made from a film of extruded plastic material according to this invention and in which bags the said zones without perforations extend along the length of the bags to form reinforcing strips on the walls thereof and extend outside of said walls to form handles, the zones without perforations being welded together to that end in manner known per se.

It must be understood that the number of toothed arcs of circle on the comb element is not critical and depends on the number of longitudinal perforated zones which are desired on the extruded film. It is possible to provide only one toothed arc cf circle opposite an untoothed arc of circle of the comb, these two respectively toothed and untoothed arcs of circle providing extrusion of one longitudinal zone with perforations and one longitudinal zone without perforations.

What is claimed is:

1. A process for producing a tubular structure formed by a film of extruded synthetic material, said film having regular perforations, said tubular structure being obtained by extrusion of synthetic material in a plastic state from an annular die and said die being temporarily obturated by a movable comb of teeth so as to interrupt flow of synthetic material and so as to form said synthetic material with said perforations, by steps comprising subjecting said synthetic material in its plastic and molten state, upstream of said side, to pre-calibration by forcing said synthetic material to flow along such a path that synthetic material is maintained at a thickness which is constant along said path and which is equal to the desired thickness of extruded synthetic material such that said synthetic material is thus laminated for ensuring dimensional stability in thickness, avoiding stress of said synthetic material before extrusion through said die and relaxation subsequent thereto and subjecting the laminated pre-calibrated film of said synthetic material t the action of said movable comb of teeth to form perforations in said film as said film is extruded from said die while said film beyond said die and extending beyond said film under extrusion in said die is maintained on a shoulder extending outwardly parallel to the flow of the film on which the movable teeth come into periphery abutment, said teeth coming into abutment with said shoulder at a point inside of an outer periphery of said shoulder thus preventing and further avoiding surface roughness and deformation of the perforated extruded film.

2. The process of claim 1, wherein the action of said movable teeth, adapted to produce the said perforations, is controlled so that some zones of the said film are extruded without perforations and some other zones of the film are extruded with perforations, the said lamination effect causing said zones without perforations and said zones with perforations to have a constant and equal thickness.

3. The process of claim 2, wherein the film is cut into sections which are fashioned to produce unitary products and the said zones without perforations, forming solid zones of said film, are disposed on the surface of the product so as to constitute reinforcing strips on the finished article.

4. The process disclosed by claim 1 wherein said movable teeth each have two vertical sides, both of said vertical sides being perpendicular to the direction of extrusion of said film.

5. The process disclosed by claim 1 wherein said movable teeth are distributed along at least one arc of a circle.

* * * * *